(12) United States Patent
Gu et al.

(10) Patent No.: US 12,030,823 B2
(45) Date of Patent: Jul. 9, 2024

(54) METHOD FOR MANUFACTURING CERAMIC TILES DECORATED WITH DRY PARTICLE INKS

(71) Applicants: DONGGUAN CITY WONDERFUL CERAMICS INDUSTRIAL PARK CO., LTD., Guangdong (CN); JIANGXI HEMEI CERAMICS CO., LTD., Jiangxi (CN); Chongqing Wonderful Ceramics Co., Ltd., Chongqing (CN)

(72) Inventors: Zhanwen Gu, Guangdong (CN); Jiangwen Deng, Guangdong (CN); Xuebin Liu, Guangdong (CN); Rongwei Shen, Guangdong (CN); Liang Tan, Guangdong (CN); Aifang Wang, Guangdong (CN)

(73) Assignees: DONGGUAN CITY WONDERFUL CERAMICS INDUSTRIAL PARK CO., LTD., Dongguan (CN); JIANGXI HEMEI CERAMICS CO., LTD., Yichun (CN); Chongqing Wonderful Ceramics Co., Ltd., Chongqing (CN)

( * ) Notice: Subject to any disclaimer, the term of this patent is extended or adjusted under 35 U.S.C. 154(b) by 272 days.

(21) Appl. No.: 17/376,239

(22) Filed: Jul. 15, 2021

(65) Prior Publication Data
US 2021/0340071 A1   Nov. 4, 2021

Related U.S. Application Data

(63) Continuation-in-part of application No. PCT/CN2019/092696, filed on Jun. 25, 2019.

(30) Foreign Application Priority Data

Mar. 1, 2019   (CN) .......................... 201910156695.5

(51) Int. Cl.
| | |
|---|---|
| C04B 41/86 | (2006.01) |
| C03C 8/04 | (2006.01) |
| C04B 41/00 | (2006.01) |
| C04B 41/45 | (2006.01) |
| C04B 41/53 | (2006.01) |
| C04B 41/89 | (2006.01) |

(52) U.S. Cl.
CPC ............ *C04B 41/86* (2013.01); *C03C 8/04* (2013.01); *C04B 41/0072* (2013.01); *C04B 41/4543* (2013.01); *C04B 41/5307* (2013.01); *C04B 41/89* (2013.01)

(58) Field of Classification Search
CPC . C04B 41/86; C04B 41/0072; C04B 41/4543; C04B 41/5307; C04B 41/89; C03C 8/04
See application file for complete search history.

(56) References Cited

U.S. PATENT DOCUMENTS

| | | | |
|---|---|---|---|
| 2005/0221114 A1* | 10/2005 | Watts ...................... | C04B 41/52 428/688 |
| 2022/0356124 A1* | 11/2022 | Xiao ....................... | C04B 41/86 |

FOREIGN PATENT DOCUMENTS

| | | | |
|---|---|---|---|
| CN | 101066890 A | * | 11/2007 |
| CN | 101905965 A | * | 12/2010 |
| CN | 102515703 A | | 6/2012 |
| CN | 107540344 A | | 1/2018 |
| CN | 109053226 A | | 12/2018 |
| JP | 3261684 | * | 11/1991 |
| JP | 2817332 B2 | * | 10/1998 |

OTHER PUBLICATIONS

Test methods of ceramic tiles—Part 7: Determination of resistance to surface abrasion for glazed tiles, National Standards of the People's Republic of China, Apr. 25, 2016, pp. 1-7, GB/T 3810.7-2016, corresponding to ISO 10545-7:1996.
Paints and varnishes—Cross cut test for films, National Standards of the People's Republic of China, Nov. 4, 1998, pp. 1-7, GB/T 9286-1998, corresponding to ISO 2409: 1992.

* cited by examiner

*Primary Examiner* — Nathan H Empie

(57) ABSTRACT

The present disclosure relates to the field of ceramic tiles, in particular, to a ceramic tile decorated with a dry particle ink and a manufacturing method thereof. The manufacturing method comprises the steps of A: decorating a ground coat; B: decorating to form a pattern; C: drying firstly; D: embellishing with dry particles; E: spraying a protective glaze; and F: firing. The manufacturing method has simple operation steps and convenient control, simplifies the process flow, improves production efficiency, and reduces production difficulty and production cost. By spraying with the dry particle ink, jet printing is carried out on a designated position on the surface of a green body, so that the texture sprayed can accurately correspond to the pattern-decorated texture, and the uniformity and adhesion of the dry particle distribution on the surface of the green body can be improved.

6 Claims, No Drawings

METHOD FOR MANUFACTURING CERAMIC TILES DECORATED WITH DRY PARTICLE INKS

CROSS-REFERENCE TO RELATED APPLICATIONS

The present application is Continuation-in-Part application of PCT patent application No. PCT/CN2019/092696 filed on Jun. 25, 2019, which claims the benefit of Chinese patent application No. 201910156695.5 filed on Mar. 1, 2019. The contents of all the above are hereby incorporated by reference.

TECHNICAL FIELD

The present disclosure relates to the field of ceramic tiles, in particular, to a ceramic tile decorated with a dry particle ink and a manufacturing method thereof.

BACKGROUND

With the improvement of people's living standards, quality and aesthetic requirements of ceramic tiles in selection of the decoration and decoration materials have enhanced significantly. At the same time, with the development of society and the progress of science and technology, the application of the ceramic inkjet technology in the ceramic field is increasing day by day, making surface effects of the ceramic tiles on the market more and more abundant.

Current ceramic inkjet technology uses a combination of glue and dry particles to apply the dry particles after the inkjet, and the glue is applied to parts where the dry particles need to be applied. Then, the dry particles are applied on a surface of a ceramic tile, the dry particles that are not held by the glue are removed, and the dry particles held by the glue are left. After firing, the ceramic tile with rich surface effects is produced.

However, there are still many defects in current processes, such as inkjet, sizing, and dry particle application, which make surface three-dimensional effects of the ceramic tiles not obvious, and production efficiency low:

(1) the inkjet pattern decoration and glueing are integrated, the glueing is performed after the inkjet pattern, then the pattern is likely to be blurred when the color of a product is relatively dark and the pattern decoration requires a large amount of inkjet ink;

(2) the inkjet pattern decoration, glueing and dry particle distribution are integrated, a large amount of dust is generated when the dry particles are dropping down, which will affect normal operation of the nozzle of the inkjet equipment, even block or damage the nozzle, and reduce the service life of the production equipment;

(3) at present, a kiln is used to suction away the dry particles that are not held by the glue, a negative pressure is formed by rotating a fan inside the kiln to suction away the dry particles that are not held by the glue, but these dry particles are easy to adhere to a wall and roof of the kiln; when the kiln is applied to the production of other types of products, it will cause defects such as ash contamination, limestone caves, and pinholes on glazes of the products, and it needs to spend manpower and material resources to remove the dry particles on the wall and roof of the kiln;

(4) When the green body with the dry particles is fired in the kiln, the glue has not completely volatilized and solidified, the glaze and the dry particles have not yet begun to melt to produce a melt, and the dry particles on the surface of the green body are blown away or suctioned away by a fan in the kiln. This greatly reduces the amount of the dry particles on the glaze of the product, even makes no dry particle on the glaze, and makes the surface three-dimensional effect of the finished ceramic tile inapparent. At the same time, the kiln will also generate a phenomenon of ash contamination, which reduces the quality of the finished ceramic tile.

SUMMARY OF THE DISCLOSURE

In order to overcome shortcomings and deficiencies in the prior art, the objective of the present disclosure is to provide a method for manufacturing a ceramic tile decorated with a dry particle ink. The manufacturing method has simple operation steps, convenient control, high production efficiency, and low production costs. By spraying with the dry particle ink, jet printing is carried out on a designated position on the surface of a green body, so that the jet printing texture can accurately correspond to the pattern-decorated texture. It can make the ceramic tile produced have a clear pattern, distinct layers, low glaze glossiness, a good non-slip effect, an obvious sense of dry particles, a strong three-dimensional effect, rich colors, stable physical and chemical properties, and a wide range of temperature adaptation. This method can be suitable for industrialized large-scale production.

Another objective of the present disclosure is to provide a ceramic tile decorated with a dry particle ink. The ceramic tile decorated with dry particles has a clear pattern, distinct layers, an obvious sense of dry particles, and a strong three-dimensional effect; it achieves an effect of a concave and convex mold surface on the flat green body. The ceramic tile decorated with the dry particles has low glaze glossiness, a good non-slip effect, rich colors, and stable physical and chemical properties. The ceramic tile can be suitable for industrialized large-scale production.

The objective of the present disclosure is achieved through the following technical solution: a method for manufacturing a ceramic tile decorated with a dry particle ink, wherein the method comprises the steps of A: glazing a surface of a green body with a ground coat;

B: maintaining a temperature of the green body at 40-60° C. after the green body is glazed with the ground coat of step A; then, decorating a surface of the ground coat of the green body to form a pattern;

C: performing a first drying on the green body after the green body is decorated with the pattern of step B;

D: embellishing the green body with dry particles by spreading the dry particle ink on the surface of the green body after the first drying of step C; then, performing a second drying;

E: spraying a protective glaze on the surface of the green body after the second drying of step D; and F: firing the green body after the green body is sprayed with the protective glaze of step E to produce the ceramic tile, the ceramic tile is decorated with the dry particles and has a three-dimensional pattern.

By adopting the steps above to prepare the ceramic tile decorated with the dry particles, the present disclosure has simple operation steps and convenient control. It can reduce spraying glue, spreading dry particles, suctioning dry particles and other processes in the production line, and reduce the layout of devices in the production line. It can also simplify the process, improve production efficiency, reduce production difficulty, and production cost. The present disclosure is suitable for industrialized large-scale production. By spraying with the dry particle ink, jet printing is carried out on a designated position on the surface of a green body, so that the jet printing texture can accurately correspond to the pattern-decorated texture. It can make the ceramic tile produced have a clear pattern, distinct layers, low glaze glossiness, a good non-slip effect, an obvious sense of dry particles, a strong three-dimensional effect, rich colors, stable physical and chemical properties, and a wide range of temperature adaptation.

Preferably, before step A, the green body is decorated with line textures by means of a digital material distribution method using mechanical arms, wherein, the line textures of the green body can be consistent with textures of the subsequent pattern decoration.

In step A of the present disclosure, the green body is glazed with the ground coat first, which can play a role of underpainting and whitening on the green body, so that pattern lines are clearer when a subsequent inkjet treatment is performed. This can also form a stable bonding layer of the green body and glaze, so that after spreading the dry particles and firing, an obvious sense of sand is formed, and a three-dimensional effect is strong.

Step B carries out a pattern decoration, which can improve the pattern decoration effect of the ceramic tile, so that the ceramic tile produced has a clear pattern and distinct layers; and pattern textures of the pattern decoration can be consistent with the line textures of the green body. Preferably, the silk screen, rubber cot, inkjet printing and other ways are used for the pattern decoration. Further preferably, for inkjet printing decoration, ink is installed on the decoration equipment of inkjet printing, color of the ink can be blue, red-brown, black-brown, orange, praseodymium yellow, lemon yellow, scarlet, dark golden, black, bright, white, etc. The inkjet printing is carried out according to actual decorative patterns. In addition, preferably, a total ink volume of the inkjet printing is less than 240 pL. If the total volume of the ink is above 240 pL, the product pattern will be darker, and the pattern will tend to be blurred. At the same time, the ink with a larger amount is likely to cause the separation of water and oil during the subsequent spraying of the protective glaze, which is easy to generate a phenomenon of avoiding the glaze, and affects the quality of the product. While in the pattern decoration, the temperature of the green body is maintained at 40-60° C., at this time, there is no obvious evaporation of water vapor on the glaze of the green body, so the pattern decoration is carried out. If the glaze of the green body has obvious water vapor volatilization, the phenomena of sticking net, dripping ink, pulling lines, etc. will occur during the pattern decoration, which will reduce the quality of the product.

Thereafter, in step C, the pattern-decorated green body is dried for the first time, so that the ink can be fully dried and formed. This prevents the subsequent spreading of the dry particles from causing fuzzy and chaotic pattern ink to undried ink, avoids blurring the pattern, and avoids reducing the clarity of the pattern of the product. Preferably, the first drying adopts hot air drying or infrared wave drying, wherein the hot air drying can use the preheating of the calcining kiln or eco-friendly natural gas as a heat source for drying, the temperature is maintained at 120-150° C., and the length of the kiln used is preferably 15-20 meters. The infrared wave drying adopts the eco-friendly natural gas, and the equipment length for the infrared wave drying is preferably 8-15 meters. Preferably, the distance between the drying equipment and the pattern decoration equipment is more than 3 meters, so that the pattern ink is fully adhered to the bonding layer of the green body and the glaze. If the distance is less than 3 meters, it will dry too quickly. This causes the ink to form agglomerates as a result of its surface tension, reduces the adhesion of the ink on the glaze, makes the pattern easy to be scraped off, and affects the quality of the product.

In step D, the surface of the green body after the first drying is sprayed with the dry particle ink, and dry particles are spread on the surface of the green body by means of ink. This enables the dry particles to be evenly distributed on the surface of the green body, enhances the adhesion on the pattern-decorated surface of the green body, and reduces processes of spraying the glue and suctioning the dry particles during the production process. This prevents the dry particles that are partially adhered to the glue from being blown off or suctioned off during the kiln firing process after spraying the glue, and avoids causing the dry particles to adhere to the kiln wall or roof, resulting in ash contamination, limestone caves, pinholes, etc. Furthermore, jet printing can be carried out on a designated position on the surface of a green body, so that the jet printing texture of the dry particles can accurately correspond to the pattern-decorated texture. It can make the ceramic tile produced have a clear pattern, distinct layers, low glaze glossiness, a good non-slip effect, an obvious sense of dry particles, a strong three-dimensional effect, rich colors, and stable physical and chemical properties.

After the dry particle ink is sprayed and printed, the second drying process is carried out, which can initially heat the green body sprayed and printed with the dry particle ink. This can also avoid the phenomena of cracked bricks and exploded billets, which are caused by rapid firing of the green body sprayed and printed with dry particle ink during the subsequent firing process, and improve the quality stability of the green body. Preferably, the second drying adopts hot air drying or infrared wave drying, wherein the hot air drying can use the preheating of the calcining kiln or eco-friendly natural gas as a heat source for drying, temperature is maintained at 120-150° C., and the length of the kiln used is preferably 15-20 meters. The infrared wave drying adopts the eco-friendly natural gas, and the equipment length for the infrared wave drying is preferably 8-15 meters.

Preferably, the ground coat of step A comprises the following chemical components:

| $SiO_2$ | 65-67% | $Al_2O_3$ | 17-23% | $Fe_2O_3$ | 0.10-0.15% | CaO | 1.28-1.35% |
|---|---|---|---|---|---|---|---|
| MgO | 0.6-0.7% | $K_2O$ | 2.0-2.8% | $Na_2O$ | 3.18-3.25% | $TiO_2$ | 0.08-0.12% |
| $ZrO_2$ | 0-2.17% | BaO | 4.80-4.90% | ZnO | 0.90-1.0%. | | |

The present disclosure uses the raw materials above as the ground coat, and strictly controls the amount of each raw material, so that the ground coat prepared has better viscosity, hardness, mechanical strength, and corrosion resistance. Furthermore, the expansion coefficient of the ground coat is reduced during the firing process, so that the ground coat and the green body are fully adhered and melted to form a stable bonding layer of the green body and the glaze.

Wherein, 18-23 parts of $Al_2O_3$ are the intermediate body oxides of the ground coat network. In the process of the glaze melting, $Al_2O_3$ can usually capture free oxygen to form a four-coordinated compound to enter the silicon-oxygen network, strengthen the glass network structure, improve the hardness, mechanical strength and chemical resistance of the ground coat, reduce the expansion coefficient of the ground coat, and increase the vitrification ability. However, the excessive content of $Al_2O_3$ in the ground coat will obviously increase the refractory degree of the glaze and the viscosity of the glaze melt, and reduce the bonding stability of the bonding layer of the green body and the glaze. 1.28 to 1.35 parts of CaO are outer body oxides of the divalent network. CaO can release the free oxygen at high temperatures, destroy the network structure, make the structure tighter, increase the viscosity, reduce the viscosity of the ground coat melt, help the melting of the ground coat, accelerate the solidification of the melt, reduce the expansion coefficient of the glaze, improve the hardness, chemical stability and mechanical strength of the glaze, and promote the good combination with the green body. If the amount of CaO is too much, it will increase the refractoriness of the ground coat, precipitate tiny crystal grains during the firing of the ground coat, and reduce the transparency of the ground coat. 0.6-0.7 parts of MgO is an outer body oxide of the divalent network. MgO provides free oxygen at high temperatures, increases the fluidity of the ground coat, makes it easier to coat the body, increases the bonding with the green body, increases the fluxing range, reduces the expansion coefficient of the glaze, promote the formation of the bonding layer of the green body and the glaze, reduces the tendency of the ground coat to crack, improves the shrinkage phenomenon, and increases the whiteness of the glaze. $K_2O$, $Na_2O$ and $Li_2O$ are all outer body oxides of the ground coat network; during the glaze melting process, they all have a strong "breaking network" effect, which can significantly reduce the melting temperature and viscosity of the glaze. $Li_2O$ has a better fluxing effect, and replacing sodium with lithium reduces the thermal expansion coefficient of the ground coat and improves the glossiness, chemical stability, and elasticity of the glaze. 0.90-1.0 parts of ZnO can play a good role of fluxing in a large range, increase the glossiness of the glaze, increase the whiteness of the glaze, reduce the expansion coefficient, increase the refractive index, promote the opacification, reduce the shrinkage of the ground coat during the firing process, and reduce the defects such as bald glaze and blistering caused by the shrinkage of the ground coat. $ZrO_2$ can improve whiteness and wear resistance of the glaze, and can increase crack resistance and hardness of the glaze. 4.80-4.90 parts of BaO can significantly improve the fluxing property and refractive index of the ground coat, and increase the glossiness of the glaze.

Preferably, in step C, a temperature of the first drying is from 120° C. to 150° C.; wherein in step D, a quantity of the dry particle ink is from 2 kg/m$^2$ to 3 kg/m$^2$; wherein in step D, a temperature of the second drying is from 120° C. to 150° C.

By decorating the ground coat on the green body, the present disclosure can fully melt the ground coat and the green body, combine them, improve the stability of a formed body-glaze combination, and avoid deglazing, blistering, etc., so that after spreading the dry particles and firing, an obvious sense of sand is formed, and a three-dimensional effect is strong. Preferably, after the green body is glazed with the ground coat, the volume expansion coefficient of the green body is 220-250/° C., and the whiteness is 0-75°.

Moreover, by strictly controlling the first drying temperature of the green body after the pattern decoration, the ink can be fully dried and formed, which avoids the phenomenon that the subsequent spreading of the dry particles will cause fuzzy and chaotic pattern ink to the undried ink. This phenomenon makes the pattern blurry and reduces the clarity of the product's pattern. If the drying temperature is too low, the ink will not dry sufficiently, which will easily cause the ink and the subsequent wetting agent to dissolve and penetrate each other, reducing the clarity of the pattern. If the drying temperature is too high, it is easy for the ink to dry too quickly, causing the ink to form agglomerates as a result of its surface tension, reducing the adhesion of the ink on the glaze, making the pattern easy to be scraped off, and affecting the quality of the product.

By strictly controlling the ink jet volume of the dry particle ink, the dry particle ink can be evenly sprayed on the pattern-decorated surface of the green body. This makes the jet printing texture correspond accurately to the pattern-decorated texture, which can make the pattern of ceramic tiles clear and layered. If the ink jet volume is too large, it is easy to cause the pattern and the texture sprayed of the dry particles to be blurred, which reduces the pattern definition of the product. If the ink jet volume is too small, the distribution amount of dry particles will be smaller. This reduces the dry particle sense and three-dimensional effect of the green body, and reduces the three-dimensional effect of the ceramic tile pattern.

Moreover, by strictly controlling the first drying temperature, the green body sprayed and printed with the dry particle ink can be initially heated. It can also avoid the phenomena of cracked bricks and exploded green body, which are caused by rapid firing of the green body sprayed and printed with dry particle ink during the subsequent firing process, and improve the quality stability of the green body. If the drying temperature is too low, the dry particle ink cannot be pre-heated and heated up; it is easy to cause the dry particle ink to easily produce the phenomena of cracked bricks and exploded green body due to rapid firing in the subsequent firing process, which reduces the quality stability of ceramic tiles.

Preferably, in step E, the spraying of the protective glaze is carried out by high-pressure spraying, a pressure of the high-pressure spraying is 10-20 bar, an amount of the protective glaze sprayed is 70-100 g/m$^2$; wherein in step F, the firing is carried out at 1180-1220° C. for 60-80 min.

The disclosure uses a high-pressure spray gun to spray the protective glaze on the surface of the green body after the dry particles are spread. This can effectively protect the dry particles, improve the adhesion of the dry particles on the surface of the green body, and avoid blowing away or suctioning away the dry particles and causing the dry particles to adhere to the kiln wall or roof, thereby preventing the product from ash contamination, limestone caves, pinholes, etc. And the spraying pressure and the spraying volume of the protective glaze are strictly controlled to ensure the uniformity of spraying, avoid the high pressure to wash away the adhering dry particles, and avoid the reduction of the three-dimensional effect of the surface of the green body due to the excessive amount of the glaze. If the pressure is too large, it will easily wash away the dry particles on the surface of the green body due to the excessive spraying pressure. If the pressure is too small, it is easy to cause the degree of ejective mist of the protective glaze to be too small, reducing the uniformity of the spraying. If the amount of the glaze sprayed is too low, the protection degree of the dry particles and the green body will be reduced. If the amount of the glaze sprayed is too high, it will easily reduce the three-dimensional effect of the surface of the green body due to the excessive amount of the glaze.

Preferably, 4-6 high-pressure spray guns are used to spray the protective glaze to ensure the comprehensiveness and uniformity of the spraying; more preferably, the spraying pressure of the high-pressure spray gun is 10-20 bar, the nozzle diameter of the high-pressure spray gun is 0.28-0.32 mm, and the spray angle of the nozzle of the high-pressure spray gun is 90-120°. Preferably, the height between the nozzle of the high-pressure spray gun and the brick surface is at least 70 cm. This can ensure the uniformity of the spraying, avoid the high pressure washing away the adhering dry particles. If the height between the nozzle and the brick surface is too small, the pressure sprayed by the nozzle will easily wash away or blow away the adhered dry particles, which will affect the three-dimensional effect of sand and the quality of the product.

By strictly controlling the final firing temperature and time, the crystal density of the protective glaze on the surface of the green body can be high, the strength of the ceramic tile surface can be improved, and scratches are not easy to occur. Furthermore, it can make the dry particles melt and adhere to the green body, improve the bonding stability of the green body and the dry particles, improve the quality of the product, and make it difficult to deglaze.

Preferably, in step D, the dry particle ink comprises the following raw materials in parts by weight:

| | |
|---|---|
| dry particles | 30-40 parts, |
| a dispersant | 5-10 parts, |
| a viscosity modifier | 0.05-0.15 parts, |
| a surfactant | 0.2-0.3 parts, |
| an excipient | 2-5 parts, |
| a solvent | 60-80 parts. |

In the present disclosure, the dry particle ink is prepared by kinds of raw materials above, and the dry particles are uniformly distributed on the surface of the green body via the ink jet method. The adhesion of the dry particles is high, and the dry particles are not easy to fall or fall off. Among them, the dispersant improves the dispersibility of the dry particles in the ink and the dispersion of the raw materials. The viscosity modifier improves the combination of dry particles and other raw materials in the ink system, so that the dry particles are evenly distributed on the surface of the green body as the ink is sprayed. The surfactant improves the adhesion of the dry particle ink on the surface of the green body, and makes it stably adhere to the surface of the green body, thereby improving the adhesion performance of the dry particles. The solvent improves the dispersibility and solubility of the raw materials, so that the raw materials are evenly spread on the surface of the green body. Preferably, the dry particles can be selected according to the requirements of the ceramic tiles. According to the temperature resistance, you can choose high dry particles, medium dry particles, or low temperature dry particles. According to the color effect, you can choose transparent dry particles, red brown dry particles, white goose dry particles, black dry particles, bright dry particles, etc. According to the actual needs of the hand feeling effect, the dry particles are matched at different temperatures. At the same time, different kinds of dry particles are selected for deployment according to the color of the product pattern.

Preferably, each part of the dispersant comprises 3-8 parts of polyethylene glycol, 10-12 parts of polyacrylamide 10-12, and 2-5 parts of polyacrylate; each part of the viscosity modifier comprises 20-30 parts of acrylic resin, 5-10 parts of polyethylene glycol methyl ether 5-10 parts, and 5-10 parts of ethanol; the surfactant is at least one selected from the group consisting of sodium lauryl sulfate, octylphenol polyoxyethylene ether, fatty acid polyoxyethylene ester, dodecyltrimethylammonium bromide and ethoxylated fatty acid sorbitan ester.

Compared with the use of a single kind of dispersant, the present disclosure can more effectively improve the dispersibility of dry particles in the ink system by adopting compounds of kinds of raw materials above as the dispersant. This ensures that the dry particles do not agglomerate before spraying, promotes the uniform distribution of the dry particles on the surface of the green body when spraying the dry particle ink, and further improves the adhesion of the dry particles on the surface of the green body. Among them, polyethylene glycol has good water solubility and good compatibility with other raw materials, which can significantly improve the dispersibility and solubility of raw materials in the ink system. The compound usage of polyacrylamide and polyethylene glycol used can prevent the granular dry particles from agglomerating and maintain the stability of the dispersion system. Furthermore, it can avoid the layering of dry particles due to interfacial tension after stirring and dispersion, reduce the interfacial tension between liquid-liquid and solid-liquid in the ink system, and improve the dispersibility of the system. The polyacrylate used can significantly disperse the dry particles uniformly, avoid the self-agglomeration phenomenon of the dry particles of the nano powder due to the large specific surface area and high surface energy, and play a role of efficient dispersion.

In the present disclosure, the viscosity of the dry particle ink is maintained at 500-800 cps by adopting kinds of raw materials above as the viscosity modifier. This can effectively adjust the fluidity of the dry particle ink, so that the dry particle ink can be evenly sprayed on the surface of the green body, and have excellent combination with the green body to improve the adhesion of the dry particle layer.

By the compound of anionic and non-ionic surfactants, the present disclosure can effectively improve the emulsification, solubilization, dispersibility, wettability, and other properties of the dry particle ink system. This enables the raw materials of the dry particle ink to be fully dispersed, emulsified, and adhered to the surface of the green body stably and evenly, thereby improving the adhesion of the dry particle layer. Wherein, the sodium lauryl sulfate, octylphenol polyoxyethylene ether, and fatty acid polyoxyethylene ester used have better emulsification, solubilization, wettability, dispersion properties, etc. They have low irritation, and are easily degraded. The ethoxylated fatty acid sorbitan ester used can significantly improve the hydrophilicity and combination of the ink, promote the dry particle ink to stably adhere to the surface of the green body, and improve the adhesion of the dry particle layer on the green body.

Preferably, each part of the excipient comprises 0.5-1.5 parts of a pH regulator, 1-2 parts of a dryer, and 0.5-1.0 parts of a preservative; the pH regulator is at least one selected from the group consisting of trimethylamine, triethanolamine and ammonia water; the dryer is a mixture consisting of ethanol and isopropanol at a weight ratio of 1:3-4; the preservative is at least one selected from the group consisting of 2,2'-dihydroxy-5,5'-dichlorodiphenylmethane, chloroacetamide, sodium o-phenylphenol, 2-hydroxy biphenyl, and N-(2-hydroxy propyl) aminomethanol; each part of the solvent is a mixture consisting of ethylene glycol butyl ether acetate, dipropylene glycol dimethyl ether, and propylene glycol methyl ether at a weight ratio of 3-4:1:1.5-2.5.

By adopting kinds of pH regulators above, the present disclosure can accurately control the pH value of the dry particle ink in a weakly alkaline system, promote the dispersibility and mutual solubility of various materials, and promote the uniform dispersion and attachment of the dry particle ink on the surface of the green body. Moreover, by adopting a mixture of ethanol and isopropanol as the drier, the solubility is high, and the dissolution of other substances can be better promoted. Under the premise of improving the mutual solubility of the dry particle ink system, the dispersibility of the dry particles is improved, so that they are uniformly dispersed on the surface of the green body. Furthermore, in the second drying process after the dry particle ink is sprayed, the drier has good volatility, which can promote the volatilization and drying of the solvent of the ink, and can initially heat up the dry particles and the green body. This makes the dry particle ink with part of the solvent volatilized stably fired and combined in the subsequent firing process, avoiding the presence of air bubbles in the dry particle layer due to incomplete volatilization of part of the solvent. As a result of the air bubbles, the dry particle layer has low adhesion, is easy to fall off, and has low hardness.

| | | | | | | | |
|---|---|---|---|---|---|---|---|
| $SiO_2$ | 45.25-46.25% | $Al_2O_3$ | 19-21% | $Fe_2O_3$ | 0.05-0.10% | CaO | 2.35-2.65% |
| MgO | 0.75-1.15% | $K_2O$ | 1.8-2.0% | $Na_2O$ | 4.5-4.8% | $TiO_2$ | 0.2-0.3% |
| $B_2O_3$ | 0.04-0.08% | BaO | 15.0-15.4% | ZnO | 6.0-6.5% | SrO | 3.4-3.8%. |

The present disclosure can improve the corrosion resistance of the dry particle ink, and the antibacterial and mildew resistance performance of the dry particle ink by the preservative above. This avoids destruction or damage caused by mold erosion or environmental factors such as oxygen, heat, light, and chemical erosion, which will cause discoloration, perforation, peeling, loss of adhesion and other appearance and mechanical properties of the dry particle layer. Wherein, the 2,2'-dihydroxy-5,5'-dichlorodiphenylmethane and 2-hydroxybiphenyl used can be effective by inhibiting microbial cell walls and intracellular enzymes.

By adopting kinds of raw materials above as the solvent, the present disclosure can improve the solubility of each raw material and the dispersibility of the mixture, and improve the stability of the dry particle ink system. This makes the viscosity, surface tension, etc. of the system less susceptible to changes in temperature, and makes the dry particles uniformly dispersed on the surface of the green body. Furthermore, the solvent has high volatility, after drying and firing, it is easy to volatilize, and then a dry particle layer with stable adhesion is formed.

Preferably, in step E, the protective glaze is a matte transparent protective glaze, the matte transparent protective glaze comprises the following raw materials in parts by weight:

| | |
|---|---|
| calcined zinc oxide | 5-6 parts, |
| barium carbonate | 6-8 parts, |
| potash feldspar | 15-20 parts, |
| a frit | 35-45 parts, |

-continued

| | |
|---|---|
| calcined alumina | 5-10 parts, |
| burnt talc | 10-14 parts, |
| dolomite | 1-5 parts, |
| kaolin | 6-8 parts, |
| an ultrafine quartz powder | 1-3 parts. |

By adopting the raw materials above as the protective glaze and strictly controlling the amount of each raw material, the present disclosure can ensure that the dry particles are not blown off or suctioned off during the firing process of the kiln, and the dry particles are protected. It can also improve the adhesion of the dry particles on the surface of the green body, and avoid suctioning off the dry particles and causing the dry particles to adhere to the kiln wall or roof, thereby preventing the product from ash contamination, limestone caves, pinholes, etc. Moreover, the protective glaze is matte and transparent, which will not affect the pattern effect of the green body after the pattern is decorated, and the pattern is of high definition. The protective glaze can improve the wear resistance of the ceramic tile surface, reduce its glossiness, and has an effect of matte frosting. Preferably, the processing fineness of the protective glaze is controlled to be 0.3-0.5% remaining on the 325 mesh sieve, the specific gravity is 1.30±0.01, and the glossiness of the product formed after spraying the protective glaze and firing is 5-8.

Preferably, the frit comprises the following chemical components:

By adopting the raw materials above as the frit, the present disclosure can reduce the expansion coefficient of the protective glaze during the firing process. This can also discharge carbon dioxide in advance during the firing process, so as not to affect the flatness of the protective glaze, and improve the three-dimensional effect of the ceramic tile.

Another objective of the present disclosure is achieved by the following technical solution: a ceramic tile decorated with dry particles prepared by the method above, wherein the ceramic tile decorated with the dry particles comprises, from bottom to top, a green body layer, a ground coat layer, a pattern layer, a dry particle ink layer and a protective glaze layer; a thickness of the ground coat layer is 0.05-0.2 mm, a thickness of the pattern layer is 0.05-0.1 mm, a thickness of the dry particle ink layer is 0.5-1 mm, and a thickness of the protective glaze layer is 0.02-0.03 mm.

The ceramic tile decorated with dry particles of the present disclosure is made by the steps above (ground coat decoration—pattern decoration—the first drying—spraying the dry particle ink—the second drying—spraying the protective glaze—firing). The jet printing can be carried out on a designated position on the surface of a green body, so that the texture sprayed can accurately correspond to the pattern-decorated texture. The resulting ceramic tile decorated with dry particles has a clear pattern, distinct layers, an obvious sense of dry particles, and a strong three-dimensional effect; it achieves an effect of a concave and convex mold surface on the flat green body. The ceramic tile decorated with the dry particles has low glaze glossiness, a good non-slip effect, rich colors, and stable physical and chemical properties. The ceramic tile can be suitable for industrialized large-scale production.

The method for manufacturing a ceramic tile decorated with dry particles of the present disclosure has simple operation steps and convenient control. It can reduce spraying glue, spreading dry particles, suctioning dry particles and other processes in the production line, and reduce the layout of devices in the production line. It can also simplify the process, improve production efficiency, reduce production difficulty and production cost, and is suitable for industrialized large-scale production. By spraying with the dry particle ink, the jet printing can be carried out on a designated position on the surface of a green body, so that the texture sprayed can accurately correspond to the pattern-decorated texture, and the distribution uniformity and adhesion of dry particles on the surface of the green body are improved. It can make the ceramic tile produced have a clear pattern, distinct layers, low glaze glossiness, a good non-slip effect, an obvious sense of dry particles, a strong three-dimensional effect, rich colors, stable physical and chemical properties, and a wide range of temperature adaptation.

The ceramic tile decorated with dry particles of the present disclosure has a clear pattern, distinct layers, an obvious sense of dry particles, and a strong three-dimensional effect; it achieves an effect of a concave and convex mold surface on the flat green body. The ceramic tile decorated with the dry particles has low glaze glossiness, a good non-slip effect, rich colors, and stable physical and chemical properties. The ceramic tile can be suitable for industrialized large-scale production.

DETAILED DESCRIPTION OF PREFERRED EXAMPLES

In order to facilitate understanding of those skilled in the art, the present disclosure will be further described below through examples, and the content mentioned in the examples does not limit the present disclosure.

Example 1

A method for manufacturing a ceramic tile decorated with a dry particle ink, wherein the method comprised A: glazing a surface of a green body with a ground coat;

B: maintaining a temperature of the green body at 40° C after the green body was glazed with the ground coat of step A; then, decorating a surface of the ground coat of the green body to form a pattern;

C: performing a first drying on the green body after the green body was decorated with the pattern of step B;

D: embellishing the green body with dry particles by spreading the dry particle ink on the surface of the green body after the first drying of step C; then, performing a second drying;

E: spraying a protective glaze on the surface of the green body after the second drying of step D; and F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| | | | | | | | | | |
|---|---|---|---|---|---|---|---|---|---|
| $SiO_2$ | 65% | $Al_2O_3$ | 18.5% | $Fe_2O_3$ | 0.15% | CaO | 1.35% | | |
| MgO | 0.7% | $K_2O$ | 2.8% | $Na_2O$ | 3.35% | $TiO_2$ | 0.08% | | |
| $ZrO_2$ | 2.17% | BaO | 4.90% | ZnO | 1.0%. | | | | |

In step C, a temperature of the first drying was 120° C.; wherein in step D, a quantity of the dry particle ink was 2 kg/m²; wherein in step D, a temperature of the second drying was 120° C.

In step E, the spraying of the protective glaze was carried out by high-pressure spraying, a pressure of the high-pressure spraying was 10 bar, an amount of the protective glaze sprayed was 70 g/m²; wherein in step F, the firing was carried out at 1180° C. for 80 min.

In step D, the dry particle ink comprised the following raw materials in parts by weight:

| | |
|---|---|
| dry particles | 30 parts, |
| a dispersant | 5 parts, |
| a viscosity modifier | 0.05 parts, |
| a surfactant | 0.2 parts, |
| an excipient | 2 parts, |
| a solvent | 60 parts. |

Each part of the dispersant comprised 3 parts of polyethylene glycol, 10 parts of polyacrylamide, and 2 parts of polyacrylate; each part of the viscosity modifier comprised 20 parts of acrylic resin, 5 parts of polyethylene glycol methyl ether, and 5 parts of ethanol; the surfactant was sodium lauryl sulfate.

Each part of the excipient comprised 0.5 parts of a pH regulator, 1 part of a dryer, and 0.5 parts of a preservative; the pH regulator was trimethylamine; the dryer was a mixture consisting of ethanol and isopropanol at a weight ratio of 1:3; the preservative was sodium o-phenylphenol; each part of the solvent was a mixture consisting of ethylene glycol butyl ether acetate, dipropylene glycol dimethyl ether, and propylene glycol methyl ether at a weight ratio of 3:1:1.5.

In step E, the protective glaze was a matte transparent protective glaze, the matte transparent protective glaze comprised the followings raw materials in parts by weight:

| | |
|---|---|
| calcined zinc oxide | 5 parts, |
| barium carbonate | 6 parts, |
| potash feldspar | 15 parts, |
| a frit | 35 parts, |
| calcined alumina | 5 parts, |
| burnt talc | 10 parts, |
| dolomite | 1 part, |
| kaolin | 6 parts, |
| an ultrafine quartz powder | 1 part. |

The frit comprised the following chemical components:

| | | | | | | | | | |
|---|---|---|---|---|---|---|---|---|---|
| $SiO_2$ | 45.25% | $Al_2O_3$ | 19% | $Fe_2O_3$ | 0.10% | CaO | 2.45% | | |
| MgO | 0.75% | $K_2O$ | 2.0% | $Na_2O$ | 4.8% | $TiO_2$ | 0.26% | | |
| $B_2O_3$ | 0.04% | BaO | 15.4% | ZnO | 6.5% | SrO | 3.8%. | | |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.5-1 mm, and a thickness of the protective glaze layer was 0.02-0.03 mm.

Example 2

A method for manufacturing a ceramic tile decorated with a dry particle ink, wherein the method comprised
A: glazing a surface of a green body with a ground coat;
B: maintaining a temperature of the green body at 45° C after the green body was glazed with the ground coat of step A; then, decorating a surface of the ground coat of the green body to form a pattern;
C: performing a first drying on the green body after the green body was decorated with the pattern of step B;
D: embellishing the green body with dry particles by spreading the dry particle ink on the surface of the green body after the first drying of step C; then, performing a second drying;
E: spraying a protective glaze on the surface of the green body after the second drying of step D; and
F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| $SiO_2$ | 66% | $Al_2O_3$ | 19% | $Fe_2O_3$ | 0.13% | CaO | 1.33% |
|---|---|---|---|---|---|---|---|
| MgO | 0.68% | $K_2O$ | 2.6% | $Na_2O$ | 3.23% | $TiO_2$ | 0.11% |
| $ZrO_2$ | 1.06% | BaO | 4.88% | ZnO | 0.98%. | | |

In step C, a temperature of the first drying was 130° C.; wherein in step D, a quantity of the dry particle ink was 2.2 kg/m²; wherein in step D, a temperature of the second drying was 128° C.

In step E, the spraying of the protective glaze was carried out by high-pressure spraying, a pressure of the high-pressure spraying was 12 bar, an amount of the protective glaze sprayed was 80 g/m²; wherein in step F, the firing was carried out at 1190° C. for 65 min.

In step D, the dry particle ink comprised the following raw materials in parts by weight:

| dry particles | 32 parts, |
|---|---|
| a dispersant | 6 parts, |
| a viscosity modifier | 0.08 parts, |
| a surfactant | 0.23 parts, |
| an excipient | 3 parts, |
| a solvent | 65 parts. |

Each part of the dispersant comprised 4 parts of polyethylene glycol, 10.5 parts of polyacrylamide, and 3 parts of polyacrylate; each part of the viscosity modifier comprised 22 parts of acrylic resin, 6 parts of polyethylene glycol methyl ether, and 6 parts of ethanol; the surfactant was octylphenol polyoxyethylene ether.

Each part of the excipient comprised 0.8 parts of a pH regulator, 1.2 parts of a dryer, and 0.6 parts of a preservative; the pH regulator was trimethylamine; the dryer was a mixture consisting of ethanol and isopropanol at a weight ratio of 1:3.2; the preservative was chloroacetamide; each part of the solvent was a mixture consisting of ethylene glycol butyl ether acetate, dipropylene glycol dimethyl ether, and propylene glycol methyl ether at a weight ratio of 3.2:1:1.8.

In step E, the protective glaze was a matte transparent protective glaze, the matte transparent protective glaze comprised the following aw materials in parts by weight:

| calcined zinc oxide | 5.2 parts, |
|---|---|
| barium carbonate | 6.5 parts, |
| potash feldspar | 16 parts, |
| a frit | 38 parts, |
| calcined alumina | 6 parts, |
| burnt talc | 11 parts, |
| dolomite | 2 parts, |
| kaolin | 6.5 parts, |
| an ultrafine quartz powder | 1.5 parts. |

The frit comprised the following chemical components:

| $SiO_2$ | 45.5% | $Al_2O_3$ | 19% | $Fe_2O_3$ | 0.09% | CaO | 2.60% |
|---|---|---|---|---|---|---|---|
| MgO | 1.01% | $K_2O$ | 1.90% | $Na_2O$ | 4.6% | $TiO_2$ | 0.25% |
| $B_2O_3$ | 0.05% | BaO | 15.1% | ZnO | 6.2% | SrO | 3.7%. |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.5-1 mm, and a thickness of the protective glaze layer was 0.02-0.03 mm.

Example 3

A method for manufacturing a ceramic tile decorated with a dry particle ink, wherein the method comprised
A: glazing a surface of a green body with a ground coat;
B: maintaining a temperature of the green body at 50° C after the green body was glazed with the ground coat of step A; then, decorating a surface of the ground coat of the green body to form a pattern;
C: performing a first drying on the green body after the green body was decorated with the pattern of step B;
D: embellishing the green body with dry particles by spreading the dry particle ink on the surface of the green body after the first drying of step C; then, performing a second drying;
E: spraying a protective glaze on the surface of the green body after the second drying of step D; and
F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| $SiO_2$ | 65% | $Al_2O_3$ | 20% | $Fe_2O_3$ | 0.12% | CaO | 1.31% |
|---|---|---|---|---|---|---|---|
| MgO | 0.64% | $K_2O$ | 2.4% | $Na_2O$ | 3.21% | $TiO_2$ | 0.10% |
| $ZrO_2$ | 1.5% | BaO | 4.82% | ZnO | 0.90%. | | |

In step C, a temperature of the first drying was 135° C.; wherein in step D, a quantity of the dry particle ink was 2.5 kg/m$^2$; wherein in step D, a temperature of the second drying was 135° C.

In step E, the spraying of the protective glaze was carried out by high-pressure spraying, a pressure of the high-pressure spraying was 15 bar, an amount of the protective glaze sprayed was 85 g/m$^2$; wherein in step F, the firing was carried out at 1200° C. for 70 min.

In step D, the dry particle ink comprised the following raw materials in parts by weight:

| | |
|---|---|
| dry particles | 35 parts, |
| a dispersant | 8 parts, |
| a viscosity modifier | 0.10 parts, |
| a surfactant | 0.25 parts, |
| an excipient | 3.5 parts, |
| a solvent | 70 parts. |

Each part of the dispersant comprised 5 parts of polyethylene glycol, 11 parts of polyacrylamide, and 3.5 parts of polyacrylate; each part of the viscosity modifier comprised 25 parts of acrylic resin, 8 parts of polyethylene glycol methyl ether, and 8 parts of ethanol; the surfactant was fatty acid polyoxyethylene ester.

Each part of the excipient comprised 1 part of a pH regulator, 1.5 parts of a dryer, and 0.8 parts of a preservative; the pH regulator was triethanolamine; the dryer was a mixture consisting of ethanol and isopropanol at a weight ratio of 1:3.5; the preservative was 2,2'-dihydroxy-5,5'-dichlorodiphenylmethane; each part of the solvent was a mixture consisting of ethylene glycol butyl ether acetate, dipropylene glycol dimethyl ether, and propylene glycol methyl ether at a weight ratio of 3.5:1:2.0.

In step E, the protective glaze was a matte transparent protective glaze, the matte transparent protective glaze comprised the following materials in parts by weight:

| | |
|---|---|
| calcined zinc oxide | 5.5 parts, |
| barium carbonate | 7 parts, |
| potash feldspar | 18 parts, |
| a frit | 40 parts, |
| calcined alumina | 8 parts, |
| burnt talc | 12 parts, |
| dolomite | 3 parts, |
| kaolin | 7 parts, |
| an ultrafine quartz powder | 2 parts. |

The frit comprised the following chemical components:

| | | | | | | | | | |
|---|---|---|---|---|---|---|---|---|---|
| $SiO_2$ | 45.75% | $Al_2O_3$ | 19.05% | $Fe_2O_3$ | 0.08% | CaO | 2.51% | | |
| MgO | 0.95% | $K_2O$ | 1.91% | $Na_2O$ | 4.67% | $TiO_2$ | 0.25% | | |
| $B_2O_3$ | 0.06% | BaO | 15.19% | ZnO | 6.18% | SrO | 3.40%. | | |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.5-1 mm, and a thickness of the protective glaze layer was 0.02-0.03 mm.

Example 4

A method for manufacturing a ceramic tile decorated with a dry particle ink, wherein the method comprised
A: glazing a surface of a green body with a ground coat;
B: maintaining a temperature of the green body at 55° C after the green body was glazed with the ground coat of step A; then, decorating a surface of the ground coat of the green body to form a pattern;
C: performing a first drying on the green body after the green body was decorated with the pattern of step B;
D: embellishing the green body with dry particles by spreading the dry particle ink on the surface of the green body after the first drying of step C; then, performing a second drying;
E: spraying a protective glaze on the surface of the green body after the second drying of step D; and
F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| | | | | | | | | | |
|---|---|---|---|---|---|---|---|---|---|
| $SiO_2$ | 66% | $Al_2O_3$ | 20% | $Fe_2O_3$ | 0.11% | CaO | 1.30% | | |
| MgO | 0.61% | $K_2O$ | 2.2% | $Na_2O$ | 3.19% | $TiO_2$ | 0.09% | | |
| $ZrO_2$ | 0.8% | BaO | 4.80% | ZnO | 0.90%. | | | | |

In step C, a temperature of the first drying was 140° C.; wherein in step D, a quantity of the dry particle ink was 2.8 kg/m$^2$; wherein in step D, a temperature of the second drying was 132° C.

In step E, the spraying of the protective glaze was carried out by high-pressure spraying, a pressure of the high-pressure spraying was 18 bar, an amount of the protective glaze sprayed was 90 g/m$^2$; wherein in step F, the firing was carried out at 1210° C. for 65 min.

In step D, the dry particle ink comprised the following raw materials in parts by weight:

| | |
|---|---|
| dry particles | 38 parts, |
| a dispersant | 9 parts, |
| a viscosity modifier | 0.13 parts, |
| a surfactant | 0.28 parts, |
| an excipient | 4 parts, |
| a solvent | 75 parts. |

Each part of the dispersant comprised 7 parts of polyethylene glycol, 11.5 parts of polyacrylamide, and 4 parts of polyacrylate; each part of the viscosity modifier comprised 28 parts of acrylic resin, 9 parts of polyethylene glycol methyl ether, and 9 parts of ethanol; the surfactant was dodecyltrimethylammonium bromide.

Each part of the excipient comprised 1.3 parts of a pH regulator, 1.8 parts of a dryer, and 0.8 parts of a preservative; the pH regulator was triethanolamine; the dryer was a mixture consisting of ethanol and isopropanol at a weight ratio of 1:3.8; the preservative was 2-hydroxy biphenyl; each part of the solvent was a mixture consisting of ethylene glycol butyl ether acetate, dipropylene glycol dimethyl ether, and propylene glycol methyl ether at a weight ratio of 3.8:1:2.3.

In step E, the protective glaze was a matte transparent protective glaze, the matte transparent protective glaze comprised the following raw materials in parts by weight:

| | |
|---|---|
| calcined zinc oxide | 5.8 parts, |
| barium carbonate | 7.5 parts, |
| potash feldspar | 19 parts, |
| a frit | 43 parts, |
| calcined alumina | 9 parts, |
| burnt talc | 13 parts, |
| dolomite | 4 parts, |
| kaolin | 7.5 parts, |
| an ultrafine quartz powder | 2.5 parts. |

The frit comprised the following chemical components:

| | | | | | | | | | | |
|---|---|---|---|---|---|---|---|---|---|---|
| $SiO_2$ | 46.0% | $Al_2O_3$ | 19.5% | $Fe_2O_3$ | 0.06% | CaO | 2.35% | | | |
| MgO | 0.77% | $K_2O$ | 1.85% | $Na_2O$ | 4.6% | $TiO_2$ | 0.22% | | | |
| $B_2O_3$ | 0.05% | BaO | 15.0% | ZnO | 6.1% | SrO | 3.5%. | | | |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.5-1 mm, and a thickness of the protective glaze layer was 0.02-0.03 mm.

Example 5

A method for manufacturing a ceramic tile decorated with a dry particle ink, wherein the method comprised
A: glazing a surface of a green body with a ground coat;
B: maintaining a temperature of the green body at 60° C after the green body was glazed with the ground coat of step A; then, decorating a surface of the ground coat of the green body to form a pattern;
C: performing a first drying on the green body after the green body was decorated with the pattern of step B;
D: embellishing the green body with dry particles by spreading the dry particle ink on the surface of the green body after the first drying of step C; then, performing a second drying;
E: spraying a protective glaze on the surface of the green body after the second drying of step D; and
F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| | | | | | | | |
|---|---|---|---|---|---|---|---|
| $SiO_2$ | 68% | $Al_2O_3$ | 19% | $Fe_2O_3$ | 0.10% | CaO | 1.28% |
| MgO | 0.6% | $K_2O$ | 2.0% | $Na_2O$ | 3.18% | $TiO_2$ | 0.08% |
| BaO | 4.83% | ZnO | 0.93%. | | | | |

In step C, a temperature of the first drying was 150° C.; wherein in step D, a quantity of the dry particle ink was 3 kg/m²; wherein in step D, a temperature of the second drying was 150° C.

In step E, the spraying of the protective glaze was carried out by high-pressure spraying, a pressure of the high-pressure spraying was 20 bar, an amount of the protective glaze sprayed was 100 g/m²; wherein in step F, the firing was carried out at 1220° C. for 60 min.

In step D, the dry particle ink comprised the following raw materials in parts by weight:

| | |
|---|---|
| dry particles | 40 parts, |
| a dispersant | 10 parts, |
| a viscosity modifier | 0.15 parts, |
| a surfactant | 0.3 parts, |
| an excipient | 5 parts, |
| a solvent | 80 parts. |

Each part of the dispersant comprised 8 parts of polyethylene glycol, 12 parts of polyacrylamide, and 5 parts of polyacrylate; each part of the viscosity modifier comprised 30 parts of acrylic resin, 10 parts of polyethylene glycol methyl ether, and 10 parts of ethanol; the surfactant was ethoxylated fatty acid sorbitan ester.

Each part of the excipient comprised 1.5 parts of a pH regulator, 2 parts of a dryer, and 1.5 parts of a preservative; the pH regulator was ammonia water; the dryer was a mixture consisting of ethanol and isopropanol at a weight ratio of 1:4; the preservative was N-(2-hydroxy propyl) aminomethanol; each part of the solvent was a mixture consisting of ethylene glycol butyl ether acetate, dipropylene glycol dimethyl ether, and propylene glycol methyl ether at a weight ratio of 4:1:2.5.

In step E, the protective glaze was a matte transparent protective glaze, the matte transparent protective glaze comprised the following raw materials in pails by weight:

| | |
|---|---|
| calcined zinc oxide | 6 parts, |
| barium carbonate | 8 parts, |
| potash feldspar | 20 parts, |
| a frit | 45 parts, |
| calcined alumina | 10 parts, |
| burnt talc | 14 parts, |
| dolomite | 5 parts, |
| kaolin | 8 parts, |
| an ultrafine quartz powder | 3 parts. |

The frit comprised the following chemical components:

| | | | | | | | |
|---|---|---|---|---|---|---|---|
| $SiO_2$ | 46.5% | $Al_2O_3$ | 19.41% | $Fe_2O_3$ | 0.05% | CaO | 2.35% |
| MgO | 0.75% | $K_2O$ | 1.8% | $Na_2O$ | 4.5% | $TiO_2$ | 0.2% |
| $B_2O_3$ | 0.04% | BaO | 15.0% | ZnO | 6.0% | SrO | 3.4%. |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.5-1 mm, and a thickness of the protective glaze layer was 0.02-0.03 mm.

Comparative Example 1 (Using a Common Process of Coating Glue—Spreading Dry Particles)

A method for manufacturing a ceramic tile decorated with a dry particle ink, wherein the method comprised
- A: glazing a surface of a green body with a ground coat;
- B: maintaining a temperature of the green body at 50° C after the green body was glazed with the ground coat of step A; then, decorating a surface of the ground coat of the green body to form a pattern;
- C: performing a first drying on the green body after the green body was decorated with the pattern of step B;
- D: spraying glue on the surface of the green body after the first drying of step C;
- E: embellishing the green body with dry particles by spreading the dry particle ink on the surface of the green body after spraying the glue of step D; then, performing a second drying; and
- F: firing the green body after the second drying of step E to produce the ceramic tile decorated with the dry particles.

Before step A, the green body was decorated with line textures by means of a digital material distribution method using mechanical arms.

In step A, the ground coat comprised the following chemical components:

| $SiO_2$ | 65% | $Al_2O_3$ | 20% | $Fe_2O_3$ | 0.12% | CaO | 1.31% |
|---|---|---|---|---|---|---|---|
| MgO | 0.64% | $K_2O$ | 2.4% | $Na_2O$ | 3.21% | $TiO_2$ | 0.10% |
| $ZrO_2$ | 1.5% | BaO | 4.82% | ZnO | 0.90%. | | |

In step C, a temperature of the first drying was 135° C.; wherein in step F, a temperature of the firing was 1200° C. for 70 min.

Comparative Example 2 (Without the Protective Glaze on the Basis of Example 3)

A method for manufacturing a ceramic tile decorated with a dry particle ink, wherein the method comprised
- A: glazing a surface of a green body with a ground coat;
- B: maintaining a temperature of the green body at 50° C after the green body was glazed with the ground coat of step A; then, decorating a surface of the ground coat of the green body to form a pattern;
- C: performing a first drying on the green body after the green body was decorated with the pattern of step B;
- D: embellishing the green body with dry particles by spreading the dry particle ink on the surface of the green body after the first drying of step C; then, performing a second drying; and
- E: firing the green body after the second drying of step D to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| $SiO_2$ | 65% | $Al_2O_3$ | 20% | $Fe_2O_3$ | 0.12% | CaO | 1.31% |
|---|---|---|---|---|---|---|---|
| MgO | 0.64% | $K_2O$ | 2.4% | $Na_2O$ | 3.21% | $TiO_2$ | 0.10% |
| $ZrO_2$ | 1.5% | BaO | 4.82% | ZnO | 0.90%. | | |

In step C, a temperature of the first drying was 135° C.; wherein in step D, a quantity of the dry particle ink was 2.5 kg/m²; wherein in step D, a temperature of the second drying was 135° C.

In step D, the dry particle ink comprised the following raw materials in parts by weight:

| dry particles | 35 parts, |
|---|---|
| a dispersant | 8 parts, |
| a viscosity modifier | 0.10 parts, |
| a surfactant | 0.25 parts, |
| an excipient | 3.5 parts, |
| a solvent | 70 parts. |

Each part of the dispersant comprised 5 parts of polyethylene glycol, 11 parts of polyacrylamide, and 3.5 parts of polyacrylate; each part of the viscosity modifier comprised 25 parts of acrylic resin, 8 parts of polyethylene glycol methyl ether, and 8 parts of ethanol; the surfactant was fatty acid polyoxyethylene ester.

Each part of the excipient comprised 1 part of a pH regulator, 1.5 parts of a dryer, and 0.8 parts of a preservative; the pH regulator was triethanolamine; the dryer was a mixture consisting of ethanol and isopropanol at a weight ratio of 1:3.5; the preservative was 2,2'-dihydroxy-5,5'-dichlorodiphenylmethane; each part of the solvent was a mixture consisting of ethylene glycol butyl ether acetate, dipropylene glycol dimethyl ether, and propylene glycol methyl ether at a weight ratio of 3.5:1:2.0.

A ceramic tile decorated with dry particles prepared by the method above, wherein the ceramic tile decorated with dry particles comprised, from bottom to top, a green body layer, a ground coat layer, a pattern layer, and a dry particle ink layer; a thickness of the ground coat layer was 0.05-0.2 mm, a thickness of the pattern layer was 0.05-0.1 mm, and a thickness of the dry particle ink layer was 0.5-1 mm.

Comparative Example 3 (On the Basis of Example 3, Dry Only Once Before Decorating With Dry Particles, and Do Not Dry After Decorating With Dry Particles)

A method for manufacturing a ceramic tile decorated with a dry particle ink, wherein the method comprised
- A: glazing a surface of a green body with a ground coat;
- B: maintaining a temperature of the green body at 50° C after the green body was glazed with the ground coat of step A; then, decorating a surface of the ground coat of the green body to form a pattern;
- C: drying the green body after the green body was decorated with the pattern of step B;
- D: embellishing the green body with dry particles by spreading the dry particle ink on the surface of the green body after the drying of step C;
- E: spraying a protective glaze on the surface of the green body after the embellishing of step D; and
- F: firing the green body after the green body was sprayed with the protective glaze of step E to produce the ceramic tile, the ceramic tile was decorated with the dry particles and had a three-dimensional pattern.

Before step A, the green body was decorated with line textures by means of a digital material distribution method using mechanical arms.

In step A, the ground coat comprised the following chemical components:

| SiO$_2$ | 65% | Al$_2$O$_3$ | 20% | Fe$_2$O$_3$ | 0.12% | CaO | 1.31% |
|---|---|---|---|---|---|---|---|
| MgO | 0.64% | K$_2$O | 2.4% | Na$_2$O | 3.21% | TiO$_2$ | 0.10% |
| ZrO$_2$ | 1.5% | BaO | 4.82% | ZnO | 0.90%. | | |

In step C, a temperature of the first drying was 135° C.; wherein in step D, a quantity of the dry particle ink was 2.5 kg/m².

In step E, the spraying of the protective glaze was carried out by high-pressure spraying, a pressure of the high-pressure spraying was 15 bar, an amount of the protective glaze sprayed was 85 g/m²; wherein in step F, the firing was carried out at 1200° C. for 70 min.

In step D, the dry particle ink comprised the following raw materials in parts by weight:

| dry particles | 35 parts, |
|---|---|
| a dispersant | 8 parts, |
| a viscosity modifier | 0.10 parts, |
| a surfactant | 0.25 parts, |
| an excipient | 3.5 parts, |
| a solvent | 70 parts. |

Each part of the dispersant comprised 5 parts of polyethylene glycol, 11 parts of polyacrylamide, and 3.5 parts of polyacrylate; each part of the viscosity modifier comprised 25 parts of acrylic resin, 8 parts of polyethylene glycol methyl ether, and 8 parts of ethanol; the surfactant was fatty acid polyoxyethylene ester.

Each part of the excipient comprised 1 part of a pH regulator, 1.5 parts of a dryer, and 0.8 parts of a preservative; the pH regulator was triethanolamine; the dryer was a mixture consisting of ethanol and isopropanol at a weight ratio of 1:3.5; the preservative was 2,2'-dihydroxy-5,5'-dichlorodiphenylmethane; each part of the solvent was a mixture consisting of ethylene glycol butyl ether acetate, dipropylene glycol dimethyl ether, and propylene glycol methyl ether at a weight ratio of 3.5:1:2.0.

In step E, the protective glaze was a matte transparent protective glaze, the matte transparent protective glaze comprised the following aw materials in parts by weight:

| calcined zinc oxide | 5.5 parts, |
|---|---|
| barium carbonate | 7 parts, |
| potash feldspar | 18 parts, |
| a frit | 40 parts, |
| calcined alumina | 8 parts, |
| burnt talc | 12 parts, |
| dolomite | 3 parts, |
| kaolin | 7 parts, |
| an ultrafine quartz powder | 2 parts. |

The frit comprised the following chemical components:

| SiO$_2$ | 45.75% | Al$_2$O$_3$ | 19.05% | Fe$_2$O$_3$ | 0.08% | CaO | 2.51% |
|---|---|---|---|---|---|---|---|
| MgO | 0.95% | K$_2$O | 1.91% | Na$_2$O | 4.67% | TiO$_2$ | 0.25% |
| B$_2$O$_3$ | 0.06% | BaO | 15.19% | ZnO | 6.18% | SrO | 3.40%. |

A ceramic tile decorated with dry particles prepared by the method above, wherein the ceramic tile decorated with dry particles comprised, from bottom to top, a green body layer, a ground coat layer, a pattern layer, a dry particle ink layer and a protective glaze layer; a thickness of the ground coat layer was 0.05-0.2 mm, a thickness of the pattern layer was 0.05-0.1 mm, a thickness of the dry particle ink layer was 0.2-0.5 mm, and a thickness of the protective glaze layer was 0.02-0.03 mm.

Comparative Example 4 (The Protective Glaze Was a Conventional Protective Glaze That Was Commercially Available)

The difference between this example and the example 3 above lay in:

In step E, the protective glaze was a conventional protective glaze that was commercially available.

The ceramic tiles decorated with dry particles prepared in examples 1-5 above and comparative examples 1-4 were tested for properties such as hardness, wear resistance, glossiness, and interlayer adhesion. The test results were as follows:

| | Mohs hardness | Grade of wear resistance | Glossiness | Adhesion grade of dry particle layer |
|---|---|---|---|---|
| Example 1 | >7 | 4 | 8° | 0 |
| Example 2 | >7 | 5 | 7° | 0 |
| Example 3 | >7 | 5 | 5° | 0 |
| Example 4 | >7 | 4 | 6° | 0 |
| Example 5 | >7 | 4 | 8° | 0 |
| Comparative example 1 | 6.0 | 2 | 11° | 2 |
| Comparative example 2 | 6.0 | 3 | 12° | 1 |
| Comparative example 3 | 5.0 | 2 | 8° | 1 |
| Comparative example 4 | 6.0 | 3 | 10° | 1 |

Wherein, the grade of wear resistance was tested according to a test method of GB/T 3810.7-2016 Standard, and the degree of surface wear traces of samples after grinding at a specific grinding speed was observed. The grade of wear resistance is divided into 0-5 grades, and specific grades are as follows:

| Grade | The number of grinding revolutions with visible abrasion |
|---|---|
| 0 | 100 |
| 1 | 150 |
| 2 | 600 |
| 3 | 750, 1500 |
| 4 | 2100, 6000, 12000 |
| 5 | >12000 |

The adhesion grade of the dry particle layer was tested according to a cross-cut test method of GB/T9286-98 Standard, and shedding of the dry particle layer of the test sample was observed. The adhesion grade of the dry particle layer is divided into 0-5 grades, and specific grades are as follows:

| Grade | Description of situation |
|---|---|
| 0 | Edges are completely smooth, and there is no shedding. |
| 1 | There is shedding at an intersection of the cross-cut incision and/or an edge of |

-continued

| Grade | Description of situation |
|---|---|
| | the incision, but the effect of the cross-cut area is obviously not more than 5%. |
| 2 | There is shedding at an intersection of the cross-cut incision and/or an edge of the incision; an affected cross-cut area is obviously larger than 5%, but obviously not larger than 15%. |
| 3 | Part or all of a cutting edge is peeled off as large pieces, and/or partly or completely peeled off on different parts of each; an affected cross-cut area is obviously larger than 15%, but obviously not larger than 35%. |
| 4 | There are large fragments falling off along the edge of the incision, and/or partial or complete shedding appears in some squares; an affected cross-cut area is obviously larger than 35%, but obviously not larger than 65%. |
| 5 | A peeling degree exceeds 4 grades. |

According to the test data above, the ceramic tiles made by the disclosure had clear patterns, distinct layers, low glaze glossiness, good non-slip effects, obvious senses of dry particles, strong three-dimensional effects, rich colors, high hardness, high dry particle adhesion, and stable physical and chemical properties.

In comparative example 1, instead of using the dry particle ink of the present disclosure to prepare a dry particle layer, the common spreading process of dry particles on the market was adopted, and the dry particles were spread directly after the glue was spread on the green body. Compared with the ceramic tile prepared in each example of the present disclosure, the surface of the ceramic tile produced in comparative example 1 had lower wear resistance, a wear resistance grade of 2, lower dry particle adhesion, a dry particle layer adhesion grade of 2, slightly higher glossiness (11°), lower slip resistance, a lower dry particle sense, and slightly lower hardness (6.0). This showed that, by spraying the dry particle ink on the surface of the green body of the ceramic tile, the jet printing can be carried out on a designated position on the surface of a green body, so that the texture sprayed can accurately correspond to the pattern-decorated texture, and the distribution uniformity and adhesion of dry particles on the surface of the green body were improved. And the first drying was carried out after the pattern decoration, so that the ink can be fully dried and formed. This prevented the subsequent spreading of the dry particles from causing fuzzy and chaotic pattern ink to undried ink, and improved the uniformity and adhesion of dry particles on the surface of the green body. Furthermore, after the dry particle ink was sprayed, the second drying process was carried out, which can initially heat the green body sprayed and printed with the dry particle ink. This can also avoid the phenomena of cracked bricks and exploded billets, which were caused by rapid firing of the green body sprayed and printed with dry particle ink during the subsequent firing process, and improve the adhesion and hardness of the dry particle layer. It can make the green body of the ceramic tile prepared and the dry particles form a stable bonding layer of body-particle-glaze. The ceramic tile of the present disclosure had an obvious sense of sand, a strong three-dimensional effect, a clear pattern, rich colors, high hardness, high adhesion of the dry particle layer, a difficulty of shedding, high surface wear resistance, low glossiness, and a good non-slip effect.

Compared with example 3, in comparative example 2, the protective glaze was not sprayed at the end of the process, and the ceramic tile produced had lower surface wear resistance, a wear resistance grade of 2, lower dry particle adhesion (Grade 1), higher glossiness (12°), lower slip resistance, a lower dry particle sense, and slightly lower hardness (6.0). This showed that by spraying the protective glaze on the surface of the body after the dry particles was spread, and strictly controlling the spraying pressure and the amount of the protective glaze, the present disclosure can protect the dry particles and improve the adhesion of dry particles on the surface of the green body. This can avoid causing the dry particles to adhere to the kiln wall or roof as a result of the dry particles being blown away or suctioned away, thereby preventing the product from ash contamination, limestone caves, pinholes, etc. It can also make the green body of the ceramic tile and the dry particles form a stable bonding layer of body-glue-particle-glaze, thereby the ceramic tile had an obvious sense of sand, a strong three-dimensional effect, a clear pattern, rich colors, high hardness, high adhesion of the dry particle layer, a difficulty of shedding, high surface wear resistance, low glossiness, and a good non-slip effect.

In the process of comparative example 3, compared with Example 3, drying was only performed once before spraying the dry particle ink, and there was no second drying after spraying the dry particle ink. The surface of the ceramic tile produced had lower wear resistance, a wear resistance grade of 2, lower dry particle adhesion (grade 1), higher glossiness (8°), lower slip resistance, a lower dry particle sense, and slightly lower hardness (5.0). This showed that by performing the second drying process after spraying the dry particle ink, the present disclosure can initially heat the green body sprayed and printed with the dry particle ink. This can also avoid the phenomena of cracked bricks and exploded billets, which are caused by rapid firing of the green body sprayed and printed with dry particle ink during the subsequent firing process, and improve the adhesion and hardness of the dry particle layer. It can make the green body of the ceramic tile prepared and the dry particles form a stable bonding layer of body-particle-glaze. The ceramic tile of the present disclosure had an obvious sense of sand, a strong three-dimensional effect, a clear pattern, rich colors, high hardness, high adhesion of the dry particle layer, a difficulty of shedding, high surface wear resistance, low glossiness, and a good non-slip effect.

Compared with example 3, in comparative example 4, the protective glaze used in the process was a commercially available conventional protective glaze instead of the raw material formula of the protective glaze of the present disclosure; the ceramic tile produced had lower surface wear resistance, a wear resistance grade of 3, lower dry particle adhesion (Grade 1), higher glossiness (10°), lower slip resistance, a lower dry particle sense, and slightly lower hardness (6.0). This showed that spraying the protective glaze of the present disclosure can protect the dry particles to ensure that the dry particles are not blown off or suctioned off during the kiln firing process. It can also improve the adhesion of the dry particles on the surface of the green body, avoid causing the dry particles to adhere to the kiln wall or roof due to the dry particles being suctioned away, thereby preventing the product from ash contamination, limestone caves, pinholes, etc. At the same time, it can improve the wear resistance of the ceramic tile surface, reduce its glossiness, and have the effect of matte frosting. It can also make the green body of the ceramic tile and the dry particles form a stable bonding layer of body-glueparticle-glaze, thereby the ceramic tile has an obvious sense of sand, a strong three-dimensional effect, a clear pattern, rich colors, high hardness, high adhesion of the dry particle layer, a difficulty of shedding, high surface wear resistance, low glossiness, and a good non-slip effect.

The descriptions above are only the preferred examples of the present disclosure, and the specific examples above do not limit the present disclosure. Various variations and modifications can occur within the scope of the technical idea of the present disclosure; all embellishments, modifications or equivalent replacements made by those of ordinary skill in the art according to the descriptions above fall within the protection scope of the present disclosure.

What is claimed is:

1. A method for manufacturing a ceramic tile decorated with a dry particle ink, wherein the method comprises
   A: glazing a surface of a green body with a ground coat;
   B: maintaining a temperature of the green body at 40-60° C. after the green body is glazed with the ground coat of step A; then, decorating a surface of the ground coat of the green body to form a pattern;
   C: performing a first drying on the green body after the green body is decorated with the pattern of step B;
   D: embellishing the green body with dry particles by spreading the dry particle ink on the surface of the green body after the first drying of step C; then, performing a second drying;
   E: spraying a protective glaze on the surface of the green body after the second drying of step D; and
   F: firing the green body after the green body is sprayed with the protective glaze of step E to produce the ceramic tile, the ceramic tile is decorated with the dry particles and has a three-dimensional pattern,
   wherein in step D, the dry particle ink comprises the following raw materials in parts by weight:

| | |
|---|---|
| dry particles | 30-40 parts, |
| a dispersant | 5-10 parts, |
| a viscosity modifier | 0.05-0.15 parts, |
| a surfactant | 0.2-0.3 parts, |
| an excipient | 2-5 parts, |
| a solvent | 60-80 parts. |

2. The method according to claim 1, wherein in step C, a temperature of the first drying is from 120° C. to 150° C.; wherein in step D, a quantity of the dry particle ink is from 2 kg/m² to 3 kg/m²; wherein in step D, a temperature of the second drying is from 120° C. to 150° C.

3. The method according to claim 1, wherein each part of the dispersant comprises 3-8 parts of polyethylene glycol, 10-12 parts of polyacrylamide, and 2-5 parts of polyacrylate; each part of the viscosity modifier comprises 20-30 parts of acrylic resin, 5-10 parts of polyethylene glycol methyl ether, and 5-10 parts of ethanol; the surfactant is at least one selected from the group consisting of sodium lauryl sulfate, octylphenol polyoxyethylene ether, fatty acid polyoxyethylene ester, dodecyltrimethylammonium bromide and ethoxylated fatty acid sorbitan ester.

4. The method according to claim 1, wherein each part of the excipient comprises 0.5-1.5 parts of a pH regulator, 1-2 parts of a dryer, and 0.5-1.0 parts of a preservative; the pH regulator is at least one selected from the group consisting of trimethylamine, triethanolamine and ammonia water; the dryer is a mixture consisting of ethanol and isopropanol at a weight ratio of 1:3-4; the preservative is at least one selected from the group consisting of 2,2'-dihydroxy-5,5'-dichlorodiphenylmethane, chloroacetamide, sodium o-phenylphenol, 2-hydroxy biphenyl, and N-(2-hydroxy propyl) aminomethanol; each part of the solvent is a mixture consisting of ethylene glycol butyl ether acetate, dipropylene glycol dimethyl ether, and propylene glycol methyl ether at a weight ratio of 3-4:1:1.5-2.5.

5. The method according to claim 1, wherein in step E, the protective glaze is a matte transparent protective glaze, the matte transparent protective glaze comprises the following raw materials in parts by weight:

| | |
|---|---|
| calcined zinc oxide | 5-6 parts, |
| barium carbonate | 6-8 parts, |
| potash feldspar | 15-20 parts, |
| a frit | 35-45 parts, |
| calcined alumina | 5-10 parts, |
| burnt talc | 10-14 parts, |
| dolomite | 1-5 parts, |
| kaolin | 6-8 parts, |
| an ultrafine quartz powder | 1-3 parts. |

6. The method according to claim 1, wherein in step E, the spraying of the protective glaze is carried out by high-pressure spraying, a pressure of the high-pressure spraying is 10-20 bar, an amount of the protective glaze sprayed is 70-100 g/m²; wherein in step F, the firing is carried out at 1180-1220° C. for 60-80 min.

* * * * *